(No Model.)
T. R. L. DAUGHTREY & A. M. COWART.
INSECT TRAP.
No. 573,814. Patented Dec. 22, 1896.
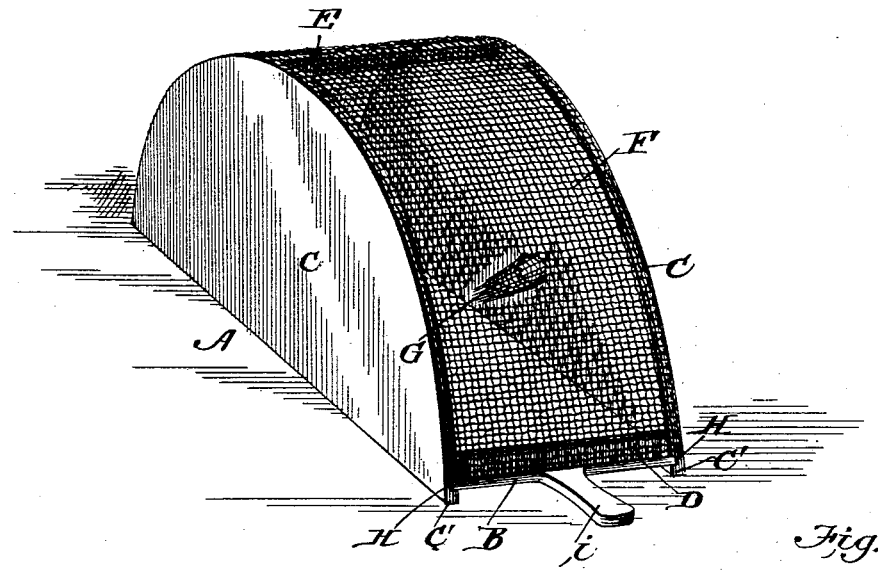
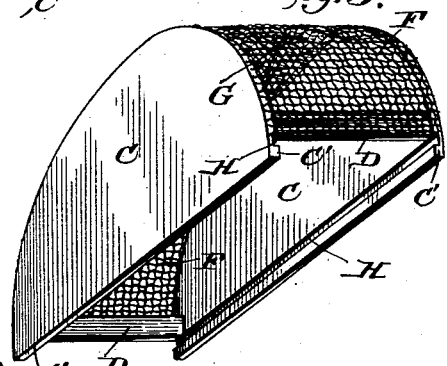
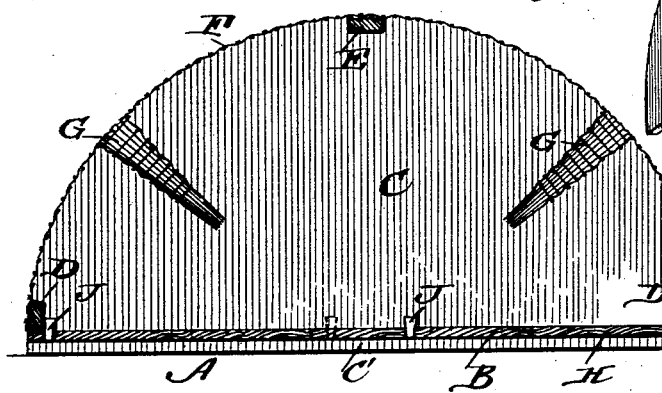
WITNESSES:
M. D. Blondell
P. B. Turpin
INVENTORS
T. R. L. Daughtrey.
A. M. Cowart.
BY Munn & Co.
ATTORNEYS.

UNITED STATES PATENT OFFICE.

THOMAS R. L. DAUGHTREY AND ANDREW M. COWART, OF PUNTA GORDA, FLORIDA.

INSECT-TRAP.

SPECIFICATION forming part of Letters Patent No. 573,814, dated December 22, 1896.

Application filed September 5, 1896. Serial No. 604,923. (No model.)

*To all whom it may concern:*

Be it known that we, THOMAS R. L. DAUGHTREY and ANDREW M. COWART, of Punta Gorda, in the county of De Soto and State of Florida, have invented a new and useful Improvement in Traps, of which the following is a specification.

Our invention is an improved trap intended especially for roaches, flies, and similar pests; and the invention has for an object to provide a simple construction which can be cheaply made, will be efficient in catching the insects, and can be readily emptied and cleaned.

The invention consists in certain novel constructions, combinations, and arrangements of parts, as will be hereinafter described, and pointed out in the claims.

In the drawings, Figure 1 is a perspective view. Fig. 2 is a longitudinal section of the trap, and Fig. 3 is an inverted perspective view of the body of the trap.

The trap is shown as composed of the body A and bottom B. The body is composed of the side plates C C, the end cross-bars D D, and the crown cross-bar E E, the whole being covered by a gauze or other trap net F, extended between the end bars D D and between the rounded upper edges of the side plates C C. The covering F has one or more cone-shaped entrances G, through which the insects may enter, but which will prevent them from passing out.

The body A is entirely open and unobstructed at the bottom, and at their lower ends the sides C C extend at C' below the end cross-bars D and are provided below said cross-bars in their inner faces with grooves H, forming ways for the bottom I, which is fitted to said ways and slid therein into position to close the open bottom of the body or to expose an opening through which the insects may be discharged. At its upper side the bottom I fits closely against the under edges of the end cross-bars D D and is provided at one end with an extension *i*, forming a handle by which the bottom may be slipped in or out or the entire trap may be easily handled, as will be readily seen.

To limit the movements of the bottom, we provide it on its upper side, between the end cross-bars D, with a stop or stops J, preferably two in number, one arranged to engage the cross-bar D nearest said handle and the other to engage the cross-bar D at the opposite end of the body, as will be understood from the drawings. These stops are removable and are in the nature of plugs fitted removably in holes in the upper side of the bottom, so they can be entirely removed when it is desired to remove the bottom from the trap.

The operation will be readily understood. The trap may be baited with any suitable substance and the bottom closed, the trap being placed in a favorable position. The insects will pass in the entrance and cannot escape. The trap when filled can be lifted by the handles and placed over the fire and the trap inclined so the body will slide down the bottom, exposing an opening between the cross-bar and the end of the bottom, out through which the roaches or other insects or vermin will be discharged. The trap may then be inclined in the opposite direction, bringing the body back to position for use.

To withdraw the bottom, it is only necessary to remove the plug-stops, when the bottom may be slid entirely out of the body in order to thoroughly cleanse the same and the interior of the body of the trap.

Having thus described our invention, what we claim as new, and desire to secure by Letters Patent, is—

1. The trap herein described consisting of the body having end cross-bars and sides extended between the cross-bars and provided with ways, the bottom sliding in such ways adjacent to the lower edges of the end cross-bars and the removable stop or stops on the upper side of said bottom between the end cross-bars and in position to engage the same substantially as shown and described.

2. The trap herein described consisting of the side plates provided in their inner faces near their lower edges with grooves or ways the end cross-bars connecting such side plates and arranged adjacent to the upper side of said ways, the crown cross-bar connecting said side plates at the crown thereof, the trap-netting having inlets, the bottom sliding in said ways and having at one end an extended handle and the removable stops on the upper side of the bottom between the end cross-bars, said stops being spaced apart and arranged to engage the adjacent end cross-bar substantially as shown and described.

THOMAS R. L. DAUGHTREY.
ANDREW M. COWART.

Witnesses:
WM. L. DAUGHTREY,
JOHN S. ROGERS.